United States Patent
Bhaisora et al.

(10) Patent No.: US 7,261,064 B2
(45) Date of Patent: Aug. 28, 2007

(54) SYSTEM AND METHOD FOR REDUCING EMISSION FROM A COMBUSTION ENGINE

(75) Inventors: Shailesh Singh Bhaisora, Bangalore (IN); Michael John Bowman, Niskayuna, NY (US); Sauri Gudlavalleti, Albany, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 10/955,412

(22) Filed: Oct. 1, 2004

(65) Prior Publication Data

US 2006/0070587 A1  Apr. 6, 2006

(51) Int. Cl.
*F02B 43/08* (2006.01)

(52) U.S. Cl. ........................... 123/3; 123/179.7
(58) Field of Classification Search ............. 123/3, 123/1 A, 179.7, 179.14
See application file for complete search history.

(56) References Cited

U.S. PATENT DOCUMENTS

| | | | | |
|---|---|---|---|---|
| 4,108,114 A | * | 8/1978 | Kosaka et al. ............ | 123/3 |
| 4,125,090 A | * | 11/1978 | Masunaga et al. ........ | 123/3 |
| 4,170,200 A | * | 10/1979 | Takeuchi et al. ......... | 123/3 |
| 4,520,764 A | * | 6/1985 | Ozawa et al. ............ | 123/3 |
| 5,899,175 A | * | 5/1999 | Manikowski et al. ..... | 123/3 |
| 6,303,098 B1 | * | 10/2001 | Kramarz et al. ......... | 423/656 |
| 6,502,533 B1 | * | 1/2003 | Meacham ................ | 123/3 |
| 6,521,204 B1 | * | 2/2003 | Borup et al. ............ | 423/652 |
| 6,609,582 B1 | | 8/2003 | Botti et al. | |
| 6,793,910 B1 | * | 9/2004 | Lyons et al. ............ | 423/650 |
| 7,013,845 B1 | * | 3/2006 | McFarland et al. ....... | 123/3 |
| 2003/0168263 A1 | | 9/2003 | Botti et al. | |
| 2004/0055586 A1 | | 3/2004 | Botti et al. | |
| 2005/0226809 A1 | * | 10/2005 | Gudlavalleti et al. ..... | 423/651 |

* cited by examiner

*Primary Examiner*—Tony M. Argenbright
*Assistant Examiner*—Katrina B. Harris
(74) *Attorney, Agent, or Firm*—Patrick K. Patnode; Curtis B. Brueske

(57) ABSTRACT

A combustion engine system comprises a plurality of cylinders configured to combust a mixed fuel to produce an exhaust gas and at least one reforming cylinder configured to receive a first portion of a fuel and deliver a reformed hydrogen-containing gas. The hydrogen-containing gas is introduced into a second portion of the fuel to form the mixed fuel to reduce emission from the combustion engine system.

31 Claims, 4 Drawing Sheets

SYSTEM AND METHOD FOR REDUCING EMISSION FROM A COMBUSTION ENGINE

BACKGROUND OF THE INVENTION

The present disclosure relates generally to a system and method for reducing emissions from a combustion engine and particularly to a system and method for reducing emissions from a combustion engine by enriching the combustion fuel with hydrogen-containing gas.

Current technologies for reducing emission of toxic gases, such as NOx from reciprocating engines using natural gas as fuel, rely on lean combustion. Lean combustion reduces the peak temperatures within the cylinders in the engine, and hence reduces the production of NOx. Gases such as NOx are formed by reactions between nitrogen and oxygen in air that is used for combustion in an engine. Formation of NOx strongly depends on the temperature of combustion. Due to low flame speed of natural gas, there are limits to lean combustion without affecting combustion stability. Other methods of NOx reduction involve use of after-treatment technologies that are costly and can have reliability issues when used with fuels other than natural gas. Hydrogen enrichment of a fuel is another way for reducing the production and emission of NOx.

Hydrogen gas, used for enrichment of a fuel prior to combustion, may be produced in different routes including external partial oxidation reactor, external steam reformer, electrolyzer etc. However, storing and delivering the hydrogen gas required for enrichment of the combustion fuels increase the cost of a combustion system and also raises safety issues.

Therefore there is a need for a combustion engine system, which system can produce hydrogen safely and efficiently for the purpose of hydrogen enrichment of the combustion fuel.

SUMMARY OF THE INVENTION

In one aspect, a combustion engine system comprises a plurality of cylinders configured to combust a mixed fuel to produce an exhaust gas and at least one reforming cylinder configured to receive a first portion of a fuel and deliver a reformed hydrogen-containing gas. The hydrogen-containing gas is introduced into a second portion of the fuel to form the mixed fuel to reduce emission from the combustion engine system.

In yet another aspect, a reciprocating combustion engine system comprises a plurality of cylinders configured to combust a mixed fuel to produce an exhaust gas; and at least one reforming cylinder configured to receive a first portion of a fuel and deliver a reformed hydrogen-containing gas. The hydrogen-containing gas is introduced into a second portion of the fuel to form the mixed fuel to reduce emission from the combustion engine system.

In another aspect, a method for reducing emission from a combustion engine comprises introducing a first portion of a fuel into an at least one reforming cylinder of the combustion engine and reforming the first portion of the fuel in the reforming cylinder to generate a hydrogen containing gas. The method further comprises mixing the hydrogen containing gas with a second portion of the fuel to generate a mixed fuel and combusting the mixed fuel in a plurality of cylinders of the combustion engine to produce an exhaust gas.

BRIEF DESCRIPTION OF THE DRAWINGS

Referring to the exemplary drawings wherein like elements are numbered alike in the accompanying Figures.

DETAILED DESCRIPTION OF THE INVENTION

A combustion engine system comprises a plurality of cylinders configured to combust a mixed fuel to produce an exhaust gas, and at least one reforming cylinder configured to receive a first portion of a fuel and deliver a reformed hydrogen-containing gas. The hydrogen-containing gas is introduced into a second portion of the fuel to form the mixed fuel to reduce emission from the combustion engine system.

Figure 1:
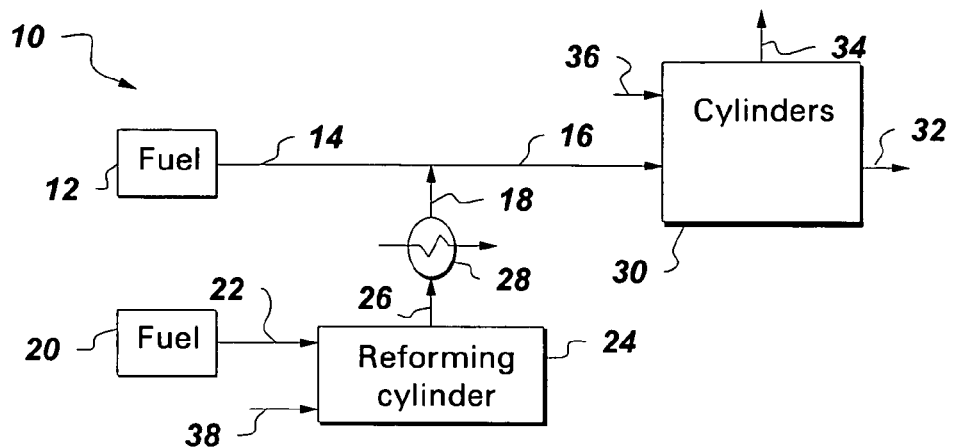
FIG. 1 illustrates a schematic representation of an exemplary combustion engine system.

FIG. 1 illustrates an exemplary combustion engine system 10 comprising a plurality of cylinders 30. The plurality of cylinders 30 are configured to combust a mixed fuel 16 to produce an exhaust gas 34 and work 32. The combustion engine system 10 comprises at least one reforming cylinder 24 configured to receive a first portion of a fuel 22 from a fuel source 20 and deliver a reformed hydrogen-containing gas 26. The hydrogen-containing gas 26 is introduced into a second portion of the fuel 14 from another fuel source 12 to form the mixed fuel 16. The mixed fuel 16 is combusted in the plurality of cylinders 30 to reduce emission from the combustion engine system 10.

The reforming cylinder 24 is advantageously used to produce the hydrogen-containing gas 26, that comprises hydrogen greater than or equal to about 0.01 weight percent (wt %), based on the total weight of gaseous composition.

The fuel used for the disclosed combustion engine system may comprise hydrocarbons, such as either aliphatic and/or aromatic hydrocarbons. Suitable examples of hydrocarbons that may be used as fuel, are alkanes, alkenes, alkynes, or the like, or combinations comprising at least one of the foregoing hydrocarbons. In one embodiment, the fuel is selected from a group consisting of methane, ethane, propane, butane, pentane, hexane, heptane, octane, or the like, or combinations comprising at least one of the foregoing alkenes. In an exemplary embodiment, the fuel used for the combustion engine system typically comprise natural gas or a low energy content fuel such as landfill gas, biogas etc. In the combustion process, an oxidant is required to combust the fuel. In the embodiments described here, the oxidant used for the combustion process is air. In some embodiments, the fuel used is methane or natural gas. When a fuel, such as, natural gas, is burned in a combustion process using air, gases such as NOx are formed by reactions between nitrogen and oxygen in air that is used for combustion in an engine. Formation of NOx strongly depends on the temperature of combustion. Natural gas is a "clean burning" fuel, due to its low carbon monoxide (CO) and particulates emissions. But the NOx emissions from combustion of natural gas are high when used in engines, for example reciprocating engines. NOx formation may be controlled through lean combustion of natural gas. In lean combustion, natural gas is mixed with high percentage of air thereby diluting the natural gas concentration. But due to low flame speed of natural gas, there are limits to dilution to achieve further reduction in NOx without affecting the combustion stability. To alleviate this, hydrogen enrichment facilitates an increase in the limit of lean combustion due to the high flame speed of hydrogen (approximately 8 times that of natural gas).

Figure 2:
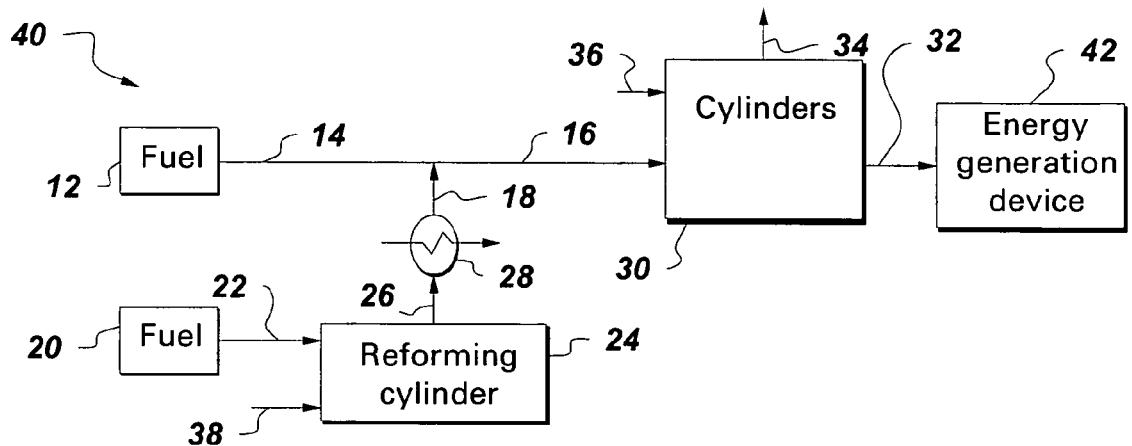
FIG. 2 illustrates schematic representation of yet another exemplary combustion engine system.

FIG. 2 illustrates yet another exemplary combustion engine system, wherein the plurality of cylinders 30 are in operable communication with an electrical energy generation system 42, such as a generator in a power plant. In another embodiment, the work 32 produced by the combustion of the mixed fuel 16 in the plurality of cylinders 30 is used to drive a compressor or any other mechanical device (not shown).

Figure 3:
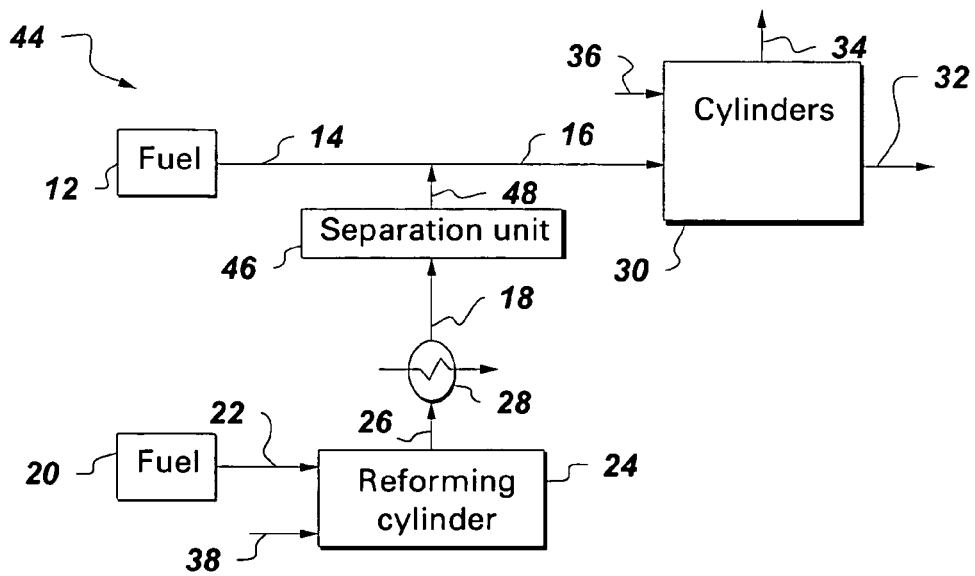
FIG. 3 illustrates schematic representation of yet another exemplary combustion engine system.

FIG. 3 illustrates yet another exemplary combustion engine system 44, wherein the exit stream 18 from heat exchanger 28 is further treated in a separation unit 46. Separation unit 46, may include a membrane penetrable by hydrogen gas molecules ($H_2$), but not by methane ($CH_4$), carbon-monoxide (CO), carbon-dioxide ($CO_2$), or water ($H_2O$) molecules, or a pressure swing adsorption (PSA) device, for separating the hydrogen gas molecules from the other aforementioned molecules, thereby producing a hydrogen rich gas stream 48. The hydrogen rich stream 48 is mixed with the second portion of fuel 14 to produce the mixed fuel 16. In some embodiments, the separation unit 46 may comprise a water gas shift reactor to convert the carbon monoxide in the hydrogen containing gas 26 to carbon dioxide before separating the hydrogen rich stream 48.

In the combustion engine systems described herein, the hydrogen containing gas 26 is generated on board, (that is within the combustion engine system) by utilizing at least one the cylinders of the engine as the reforming cylinder 24. The generation of hydrogen-containing gas 26 within the combustion engine system for the purpose of enriching the combustion fuel is cost effective and safe, as the hydrogen containing gas does not need to be stored. Also, while the embodiment described herein depicts a reciprocating piston and cylinder in the combustion engine, it will be appreciated that other cyclical engines may be employed, such as rotary engines for example.

Figure 4:
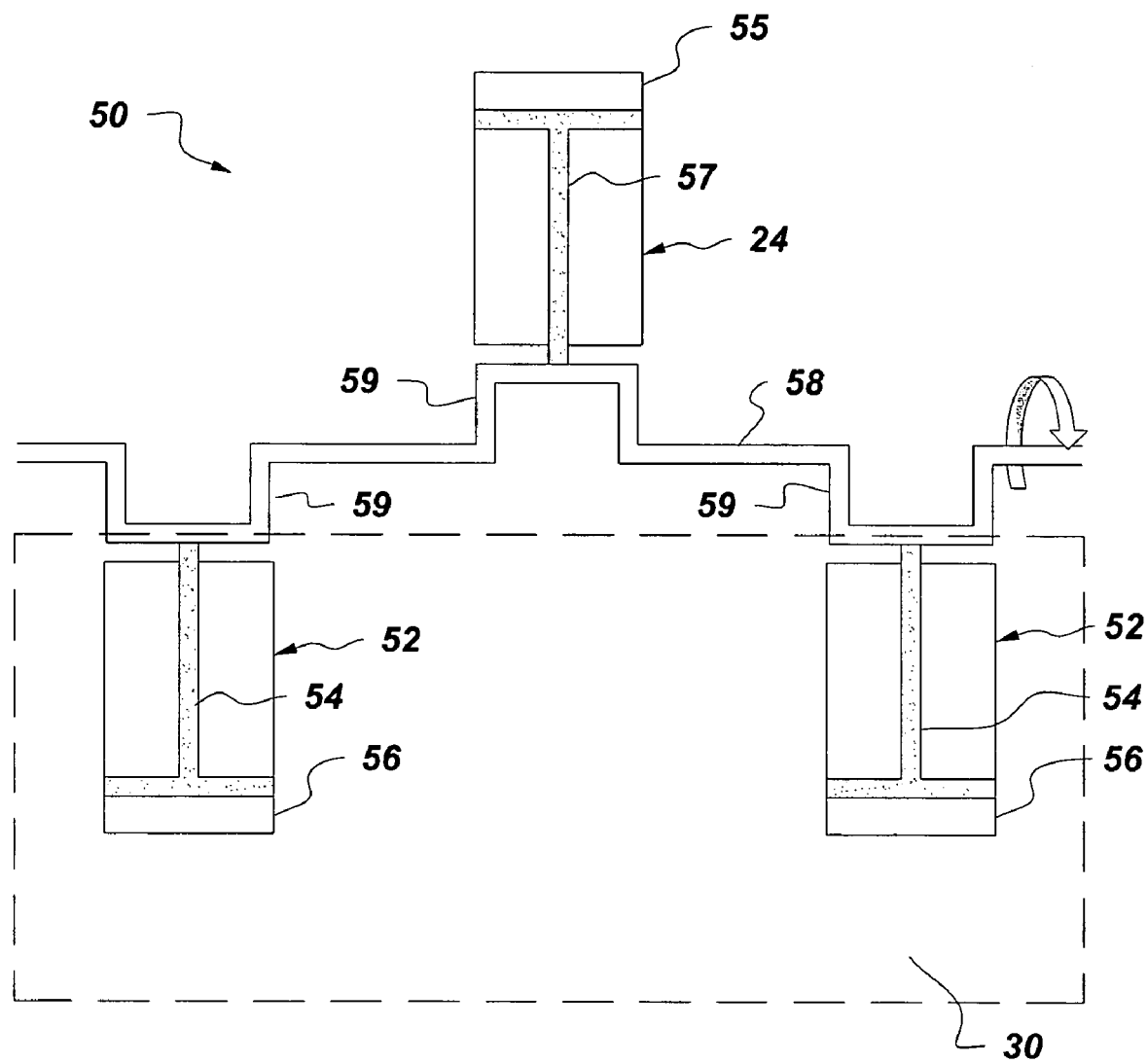
FIG. 4 illustrates an exemplary arrangement of cylinders in a combustion engine system.

The reforming cylinder 24 may comprise a drive system for cycling the reforming cylinder 24. FIG. 4 illustrates an exemplary arrangement of cylinders of a three-cylinder combustion engine 50. The combustion engine 50 comprises a plurality of cylinders 30 comprising two internal combustion cylinders (ICC) 52 and one reforming cylinder 24. In an embodiment, each of ICC 52 includes a piston 54 and a cylinder 56, which ICC 52 receives a fuel mixture and a timed ignition to provide a mechanical driving force. The reforming cylinder 24 also comprises a piston 57 and a cylinder 55. A drive shaft 58 with cranks 59 provides a mechanical connection between the reforming cylinder 24 and each ICC 52, for driving the piston 57 within cylinder 55 in a cyclical manner. While a three-cylinder system 50 is depicted, it will be appreciated that any arrangement of the internal combustion cylinders and reforming cylinders may be employed as necessary, thereby providing a scalable system 50.

The reforming cylinder 24 may utilize several reforming techniques to convert the fuel into a hydrogen-containing gas, which reforming techniques include, for example, partial oxidation, catalytic partial oxidation and steam methane reforming. In one embodiment, partial oxidation or catalytic partial oxidation is used to convert the fuel into a hydrogen-containing gas. The feed stream to the reforming cylinder 24 may preferably comprise a mixture of air or oxygen and the fuel, wherein the molar ratio of oxygen to fuel is about 0.05 to about 2.0. In one embodiment, the feed stream may comprise a mixture of air or oxygen and the fuel, wherein the molar ratio of oxygen to fuel is about 0.1 to about 1.9. In yet another embodiment, the feed stream may comprise a mixture of air or oxygen and fuel, wherein the molar ratio of oxygen to fuel is about 0.5 to about 1.75.

Figure 5:
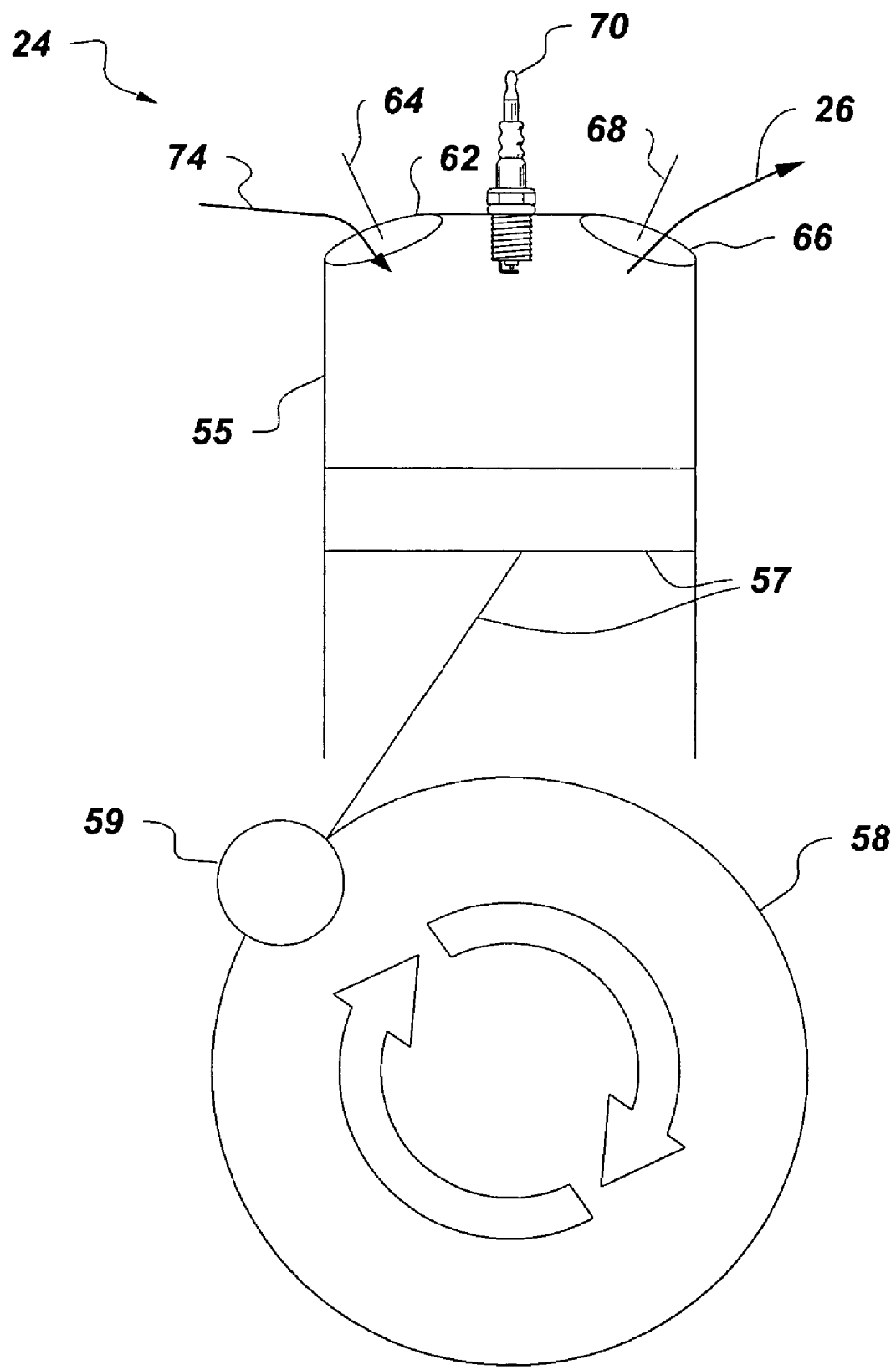
FIG. 5 illustrates a diagrammatical view of an exemplary reforming cylinder.

FIG. 5 illustrates an exemplary reforming cylinder 24 having an entry port 62 with an entry valve 64 for receiving a feed stream 74, and an exit port 66 with an exit valve 68 for delivering the hydrogen-containing gas 26. The feed stream 74 may comprise a mixture of the fuel and air or the fuel and the air may be introduced separately into the reforming cylinder 24, as shown in FIGS. 1-2. Reforming cylinder 24 is also equipped with an ignition source 70, such as, for example, a spark plug, to initiate the combustion of the feed stream 74. In one embodiment, the feed stream 74 may be pre-heated prior to entering the reforming cylinder 24 through entry port 62.

The reforming cylinder 24 can have a volume of greater than or equal to about 5 milliliters (ml). In one embodiment, the reforming cylinder 24 has a volume of greater than or equal to about 10 ml. In another embodiment, the reforming cylinder 24 has a volume of greater than or equal to about 100 ml. In yet another embodiment, the reforming cylinder 24 has a volume of greater than or equal to about 500 ml. In yet another embodiment, the reforming cylinder 24 has a volume of greater than or equal to about 1000 ml.

The process of partial oxidation involves an uncatalyzed reaction of a hydrocarbon fuel, such as natural gas or coal, with steam and oxygen at high temperature and high pressure to produce hydrogen and carbon oxides. The main reaction in the partial oxidation process is as under.

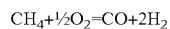

The partial oxidation reaction is an exothermic reaction and may progress in absence of any catalyst. However, the hydrogen yield per mole of methane input and the system efficiency can be significantly enhanced by use of catalysts. Large systems generally incorporate a pure oxygen source, because operation with pure oxygen, rather than air, reduces the size and cost of the reactors. The feed stream 76 is subjected to compression as well as to combustion in the reforming cylinder 24. The volumetric compression ratio within the reforming cylinder 24 during compression is greater than or equal to about 3:1, specifically greater than or equal to about 5:1 and more specifically greater than or equal to about 10:1. During the combustion, the pressure in the reforming cylinder is about 1 to about 100 kg/cm². In one embodiment, the pressure during the combustion is about 1 to about 25 kg/cm². During the combustion, the temperature in the reforming cylinder 24 is about 800 to about 1500° C. In one embodiment, the temperature during the combustion is about 1000° C. The products of the partial oxidation reaction comprises hydrogen, carbon dioxide, carbon monoxide, uncombusted fuel, steam and the inert components of air in the feed stream, such as, nitrogen. The temperature required for the reforming process to proceed fast is either internally generated through combustion and compression or through the drive system shown in FIG. 4, wherein a portion of the work done by the plurality of cylinders 30 is used to generate the required pressure to reach the required temperature for the reforming reaction in the reforming cylinder 24.

Figure 6:
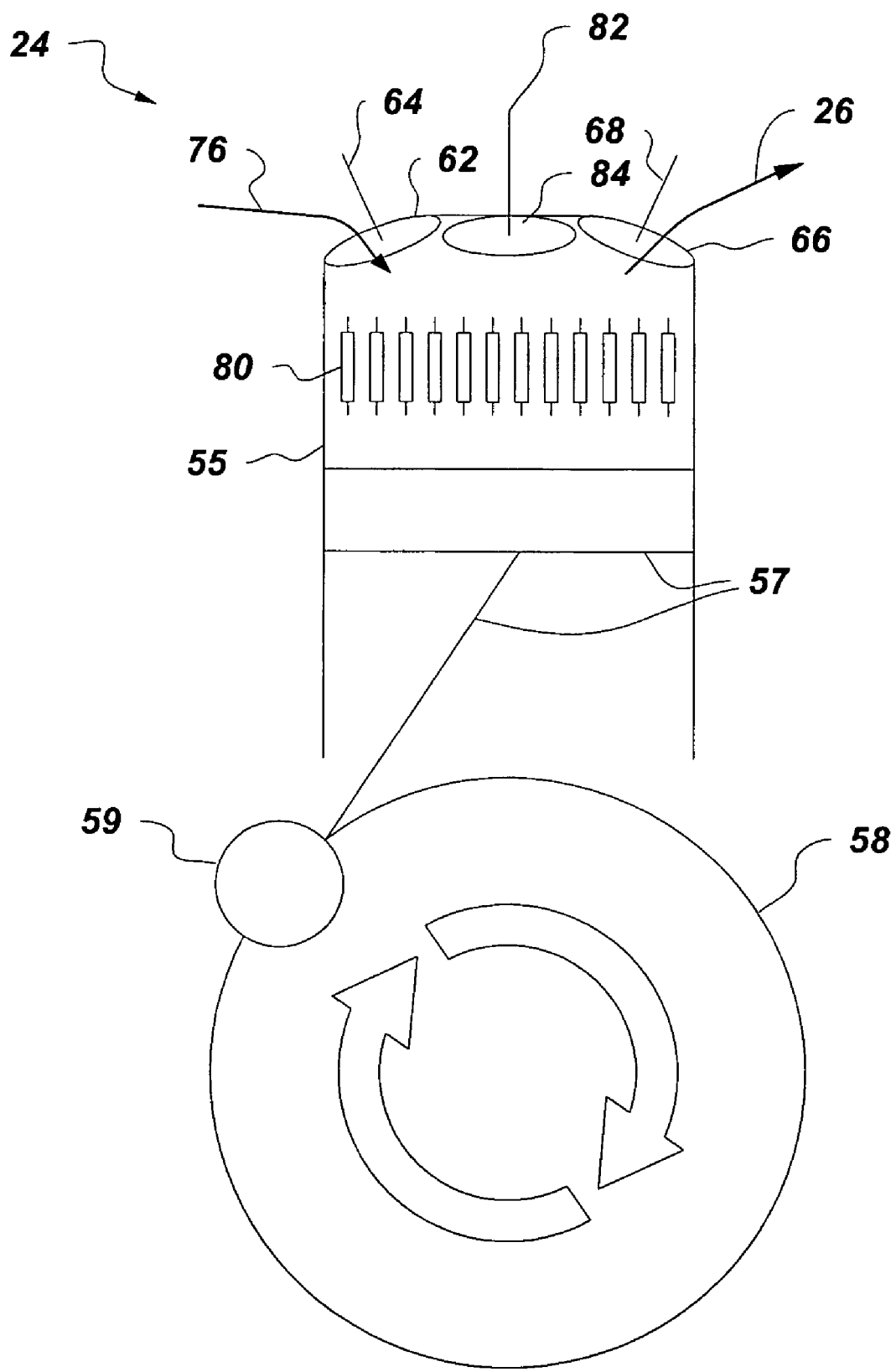
FIG. 6 illustrates a diagrammatical view of yet another exemplary reforming cylinder.

FIG. 6 illustrates yet another exemplary reforming cylinder 24, wherein the fuel is reformed through steam methane reforming process. The feed stream 76 comprising a fuel, air or oxygen, and steam is introduced into the reforming cylinder 24 either separately or in the form of a mixture. The molar ratio of oxygen to the fuel in the feed stream 76 is generally about 0.1 to about 2. As noted above, the feed stream 76 may be preheated prior to introduction into the reforming cylinder 24. The feed stream 76 may also be pre-compressed prior to introduction into the reforming cylinder 24. In one embodiment, the air or oxygen may be at a different temperature and pressure from the temperature and pressure of the fuel prior to introduction into the reforming cylinder 24. In another embodiment, the air or oxygen may be at the same temperature and pressure as the temperature and pressure of the fuel prior to introduction into the cyclical compression chamber. When the fuel and air or oxygen is introduced separately into the reforming cylinder 24, in one embodiment, the air or oxygen is introduced prior to the introduction of the fuel. Alternatively, in another embodiment, the fuel is introduced prior to the introduction of the air or oxygen.

In one embodiment, the feed stream 76 may be supplied at a temperature greater than or equal to about ambient temperature (which can be about 18 to about 28° C.), to less than or equal to about 800° C., prior to introduction in the reforming cylinder 24. If the fuel is introduced separately from the air or oxygen into the reforming cylinder 24, the fuel may be preheated to a temperature of about 100 to about 400° C., prior to introduction. The preferred preheating temperature is about 350° C. The air or oxygen may be preheated to a temperature of 100 to about 800° C., prior to introduction. The preferred preheating temperature for air or oxygen is about 500° C.

In another embodiment, the feed stream 76 may be pre-compressed to a pressure of about 1 to about 5 kg/cm² prior to introduction in the reforming cylinder 24. The preferred pre-compression pressure is about 2 kg/cm².

In the steam methane reforming reaction, methane in natural gas reacts with the steam to produce hydrogen according to the reaction given below.

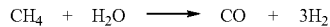

$$CH_4 + H_2O \longrightarrow CO + 3H_2$$

The reaction given above is generally termed as the steam reforming (SMR) reaction. During the steam methane reforming process, water gas shift reaction may also occurs which water gas shift reaction converts CO into $CO_2$.

Referring back to FIG. 6, the reforming cylinder 24 is configured to have an entry port 62 with an entry valve 64 for receiving a feed stream 76, and an exit port 66 with an exit valve 68 for delivering the reformed hydrogen-containing gas 26. The reforming cylinder 24 has an operational cycle that generates internal pressures and temperatures without combustion that is effective for reforming the feed stream 76 in presence of steam. The reforming cylinder 24 may also include an arrangement for heating the hydrogen-containing gas to a non-combustible temperature, such as internally via a catalyst 80 within cylinder 55, or externally via steam that may be added to the feed stream 76. In an alternative embodiment, different entry ports may be used for the steam (entry port 84). In a further alternative embodiment, the feed stream 76 may be pre-heated, using steam for example, prior to entering the reforming cylinder 24 through entry port 62.

Continued cranking of shaft 58 reduces the internal volume of reforming cylinder 24, which reduction serves to increase the pressure and temperature of the fuel.

Catalysts that may be used in the reforming section for the reforming reaction are steam-reforming catalysts. Suitable examples of the steam reforming catalysts are metals, alloys, and oxides such as transition metal oxides, alkali earth metal oxides or main group element oxides. The catalysts may be homogenous or heterogeneous catalysts. It is generally desirable for the catalysts to be monolithic catalysts. Suitable examples of metals are nickel, iron, zinc, copper, noble metals such as palladium, platinum, rhodium, or the like, or combinations comprising at least one of the foregoing metals. Suitable examples of such oxides are nickel oxide, magnesium oxide, aluminum oxide, manganese oxide, zinc oxide, copper oxide, iron oxide, or the like, or combinations comprising at least one of the foregoing oxides.

In one embodiment, the metal catalysts can be disposed on supports having a high surface area. Suitable supports are fumed silica, fumed alumina, alpha alumina, gamma-alumina, delta alumina, titania, ceria, or the like, or a combination comprising at least one of the foregoing supports. It is generally desirable for the porous supports to have a surface area of greater than or equal to about 10 square meters per gram ($m^2$/gm), preferably greater than or equal to about 20 $m^2$/gm, and more preferably greater than or equal to about 100 $m^2$/gm. The catalysts may be deposited on the porous supports by ion implantation, chemical vapor deposition, sputtering, from a suitable solvent such as alcohols, acetone, water, or the like. Supported catalysts are generally employed when the reforming section is a fluidized bed.

The reformed hydrogen-containing gas 26 may be optionally cooled in a heat exchanger 28 (as shown in FIGS. 1-2) before mixing of the hydrogen-containing gas 26 with the second portion of fuel 14 to form the mixed fuel 16. As shown in FIGS. 1-2, the mixed fuel 16 is combusted in a plurality of cylinders 30 along with air 36 to produce an exhaust gas 34 and work 32. The flow of the first portion of fuel 22 and air 38 to the reforming cylinder 24 can be varied to achieve the desired enrichment level of hydrogen. In one embodiment, the hydrogen-containing gas 26 may comprise at least 5% of hydrogen by volume.

The combustion engine system described herein may be advantageously used in power plant, vehicles, aircraft, ships, residential and office buildings, or the like, to generate energy.

Also described herein is a method for reducing emission from a combustion engine. The method comprises introducing a first portion of a fuel into at least one reforming cylinder of a combustion engine system and reforming the first portion of the fuel in the reforming cylinder to generate a hydrogen-containing gas. The method includes mixing of the hydrogen containing gas with a second portion of the fuel to generate a mixed fuel and combusting the mixed fuel in a plurality of cylinders of the combustion engine to produce an exhaust gas.

The combustion engine system described herein has several advantages. The enrichment of the fuel with hydrogen prior to combustion decreases the emission of gases such as NOx, thereby making a positive impact on the environment. The generation of hydrogen within the combustion engine system eliminates the requirement for external heating and compression requirement for the reforming process. Furthermore the disclosed combustion engine system is also safe and cost effective as the storage of hydrogen gas is not required.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A combustion engine system, comprising:
   a plurality of cylinders configured to combust a mixed fuel to produce an exhaust gas; and
   at least one reforming cylinder configured to receive a first portion of a fuel and steam to deliver a reformed hydrogen-containing gas in a steam reforming process;
   wherein said hydrogen-containing gas is introduced into a second portion of said fuel to form said mixed fuel to reduce emission from said combustion engine system.

2. The system of claim 1 further comprising a drive system for cycling said at least one reforming cylinder.

3. The system of claim 2, wherein said drive system comprises a drive shaft in operable communication with said plurality of cylinders and at least one reforming cylinders.

4. The system of claim 1, wherein said combustion engine is a reciprocating engine.

5. The system of claim 1, wherein said plurality of cylinders are in operable communication with an electrical energy generation system.

6. The system of claim 1, wherein said fuel comprises a hydrocarbon selected from the group consisting of alkanes, alkenes, alkynes and combinations thereof.

7. The system of claim 1, wherein said fuel comprises natural gas, biogas and combinations thereof.

8. The system of claim 1, wherein said mixed fuel contains at least 5 volume % of hydrogen.

9. The system of claim 1, wherein said hydrogen containing gas is cooled in a heat exchanger prior to introduction to said second portion of said fuel.

10. The system of claim 1, wherein said reforming cylinder operates at a pressure of about 1 to about 100 kg/cm$^2$, and a temperature of about 300 to about 1,500° C.

11. The system of claim 1, wherein said reforming cylinder further comprises:
    a source of said steam;
    a first entry port for receiving said first portion of said fuel and an exit port for delivering reformed said hydrogen-containing gas; and
    a second entry port for receiving the steam.

12. The system of claim 11, wherein said reforming cylinder comprises a monolithic catalyst derived from at least one metal, and wherein said metal is selected from the group consisting of nickel, iron, zinc, copper, palladium, platinum, rhodium, and combinations thereof.

13. The system of claim 1, wherein said first portion of said fuel is mixed with an oxidant prior to introduction into said at least one reforming cylinder.

14. The system of claim 13, wherein said oxidant is air.

15. The system of claim 1 further comprising a separation unit to produce a hydrogen rich stream.

16. A reciprocating combustion engine system, comprising:
    a plurality of cylinders configured to combust a mixed fuel to produce an exhaust gas; and
    at least one reforming cylinder configured to receive a first portion of a fuel and steam to deliver a reformed hydrogen-containing gas in a steam reforming process;
    wherein said hydrogen-containing gas is introduced into a second portion of said fuel to form said mixed fuel to reduce emission from said combustion engine system.

17. The system of claim 16 further comprising a drive system for cycling said at least one reforming cylinder.

18. The system of claim 16, wherein said drive system comprises a drive shaft in operable communication with said plurality of cylinders and at least one reforming cylinders.

19. The system of claim 16, wherein said combustion engine is a reciprocating engine.

20. The system of claim 16, wherein said plurality of cylinders are in operable communication with an electrical energy generation system.

21. The system of claim 16, wherein said fuel is selected from a group consisting of natural gas, biogas,and combinations thereof.

22. The system of claim 16, wherein said mixed fuel contains at least 5 volume % of hydrogen.

23. The system of claim 16, wherein said hydrogen containing gas is cooled in a heat exchanger prior to introduction to said second portion of said fuel.

24. The system of claim 16, wherein said reforming cylinder operates at a pressure of about 1 to about 100 kg/cm$^2$, and a temperature of about 300 to about 1,500° C.

25. The system of claim 16, wherein said reforming cylinder comprises a partial oxidation reactor, a catalytic oxidation reactor, or a combination comprising at least one of the foregoing reactors.

26. The system of claim 16, wherein said first portion of said fuel is mixed with an oxidant prior to introduction into said at least one reforming cylinder.

27. The system of claim 26, wherein said oxidant is air.

28. A method for reducing emission from a combustion engine, said method comprising;
    introducing a first portion of a fuel and steam into an at least one reforming cylinder of said combustion engine;
    steam reforming said first portion of said fuel in said at least one reforming cylinder to generate a hydrogen containing gas;
    mixing said hydrogen containing gas with a second portion of said fuel to generate a mixed fuel; and
    combusting said mixed fuel in a plurality of cylinders of said combustion engine to produce an exhaust gas.

29. The method of claim 28, wherein said fuel is selected from a group consisting of natural gas, biogas and combinations thereof.

30. The method of claim 28, wherein said mixed fuel contains at least 5 volume % of hydrogen.

31. The method of claim 28 further comprising cooling said hydrogen containing gas in a heat exchanger prior to said mixing.

* * * * *